(12) United States Patent
Pierce

(10) Patent No.: US 6,933,252 B2
(45) Date of Patent: Aug. 23, 2005

(54) LOW BORON CONTAINING MICROFIBERGLASS FILTRATION MEDIA

(75) Inventor: Mary E. Pierce, Mason, NH (US)

(73) Assignee: Hollingsworth & Vose Company, East Walpole, MA (US)

(*) Notice: Subject to any disclaimer, the term of this patent is extended or adjusted under 35 U.S.C. 154(b) by 496 days.

(21) Appl. No.: 09/737,109

(22) Filed: Dec. 14, 2000

(65) Prior Publication Data

US 2003/0207628 A1 Nov. 6, 2003

Related U.S. Application Data

(60) Provisional application No. 60/170,789, filed on Dec. 15, 1999.

(51) Int. Cl.$^7$ .......................... D04H 00/05; D04H 13/00
(52) U.S. Cl. .......................... 442/327; 442/331; 442/348
(58) Field of Search ................................ 442/327, 331, 442/348

(56) References Cited

U.S. PATENT DOCUMENTS

| | | | | |
|---|---|---|---|---|
| 3,847,626 A | | 11/1974 | Erickson et al. ............... | 106/50 |
| 3,847,627 A | | 11/1974 | Erickson et al. ............... | 106/50 |
| 3,876,481 A | * | 4/1975 | Erickson et al. ............... | 106/50 |
| 3,929,497 A | | 12/1975 | Clark-Monks ............... | 106/50 |
| 4,026,715 A | | 5/1977 | Erickson et al. ............... | 106/50 |
| 4,166,747 A | | 9/1979 | Neely, Jr. ..................... | 106/50 |
| 4,199,364 A | | 4/1980 | Neely ........................... | 106/50 |
| 4,396,722 A | | 8/1983 | Rapp ........................... | 501/35 |
| 4,542,106 A | | 9/1985 | Sproull ........................ | 501/38 |
| 5,156,780 A | * | 10/1992 | Kenigsberg et al. .......... | 264/22 |
| 5,789,329 A | | 8/1998 | Eastes et al. .................. | 501/36 |
| 6,321,915 B1 | * | 11/2001 | Wilson et al. ............... | 210/505 |

FOREIGN PATENT DOCUMENTS

| | | | |
|---|---|---|---|
| DE | 4017184 A1 | 6/1990 | .......... B01D/39/08 |
| EP | 1074521 | 2/2001 | |
| GB | 520427 | 9/1938 | |
| GB | 2 234 251 A * | 1/1999 | ............ C08K/7/14 |

OTHER PUBLICATIONS

Callinan et al., "The Manufacture and Properties of Paper Made From Ceramic Fibers," *NRL Report 4044*, Washington, D. C., pp 1–7 (1952).
Gnann, A. J., "Evanite Glass Fiber Physical Properties and Measurement Techniques," Evans Products Comp., Oregon.
Hitachi Manufacturing Co., "Protection Countermeasure of Boron Pollution by Hepa Filter," Inspection Dept., pp 1–7.
Inoue et al., "Study on Boron Contamination in Clean Room," Takasago Thermal Engineering Co., Japan, pp 111–116.
J. C. Binzer Papierfabrik GmbH, "New Technically Boron–Free Hepa Filter Materials," (1997).
Klocke et al., "Eliminating Boron From HEPA & ULPA Filters as a Source of Contamination in Cleanrooms," *The 10$^{th}$ International Conference on Advanced Technologies and Practices for Contamination Control, Report 4044*, pp 1–5 (1996).

(Continued)

Primary Examiner—Glenn Caldarola
Assistant Examiner—Alexis Wachtel
(74) Attorney, Agent, or Firm—Nutter McClennen & Fish LLP

(57) ABSTRACT

The present invention provides nonwoven glass composites formed from an essentially boron free glass wool and an essentially boron free chopped glass fiber, used as a reinforcing material. The nonwoven glass composites are suitable for air filtration apparatus and can be used in the semiconductor industry where the elimination of boron from clean rooms is of importance.

63 Claims, 9 Drawing Sheets

OTHER PUBLICATIONS

Robertson, A. A., "Modification of the Mechanical Properties of Paper by the Addition of Synthetic Polymers," *Mechanical Effects of Adding Synthetic Polymers,* Montreal, Canada, pp 373–390.

"Standard Method for Evaluation of Air Assay Media by the Monodisperse DOP (Dioctyl Phthalate) Smoke Test," *ASTM Designation D 2986,* pp 629–632 (1971).

Stassen, W. N., "Dispersing Glass Fibers in the Wet Process," *Nonwovens / TAPPI Seminar Notes,* Owens–Corning Fiberglass Corp., Ohio, pp 7–12.

Stevie et al., "Boron Contamination of Surfaces in Silicon Microelectronics Processing; Characterization and Causes," *J. Vac. Sci. Technol. A 9,* vol. 5, pp 2813–2815 (1991).

Tamaoki et al., "Manufacturing Process," Toshiba Microelectronics Corp., Japan.

"Testing HEPA and ULPA Filter Media IES–RP–CC021.1," *IES Institute of Environmental Sciences,* Mount Prospect, Illinois.

Wente et al., "Formation of Filter Materials From Glass Fibers," *Industrial and Engineering Chemistry,* vol. 48, pp 219–222 (1956).

Yoshizaki et al., "Characteristics of Chemicals in the Clean Room Air," Sanki Engineering Co., Japan, pp 103–106 (1999).

* cited by examiner

LOW BORON CONTAINING MICROFIBERGLASS FILTRATION MEDIA

CROSS-REFERENCE TO RELATED APPLICATION

This application claims priority to U.S. Provisional Patent Application No. 60/170,789, filed on Dec. 15, 1999, entitled "Low Boron Containing Microfiberglass Filtration Media", the contents of which are incorporated herein by reference.

FIELD OF THE INVENTION

This invention relates to nonwoven glass fiber composites having glass compositions that are boron-free, i.e., essentially free of boron. The nonwoven composites are useful as filter media, especially in the electronics and semiconductor industry.

BACKGROUND OF THE INVENTION

It has been conventional in the manufacture of glass fibers to employ glass batch ingredients that contain boron and fluorine. These ingredients of glass batch act as fluxes during melting and are generally found in the final glass composition at levels of about 9 to 11 percent by weight in borosilicate glass and 4 to 7 percent by weight in E glass. High efficiency particulate air (HEPA) and ultra low penetration air (ULPA) filters made from borosilicate glass and E glass have been used in clean rooms as a means to reduce air borne contaminants. However, it is now known that these glass filters generate boron contaminants when subjected to humid conditions and/or gaseous hydrofluoric acid which is often used in fabrication processes. For example, the microelectronics industry has identified boron as a contaminant on silicon wafers. Boron contamination on silicon wafers has been shown to lead to unintentional p-type doping.

The source of boron in cleanrooms is linked to the ambient air supply which can have as much as 500 ng/m$^2$ boron. Aluminum etching processes, ion implantation process, p-type sources and HEPA and ULPA filter media can also contribute boron contaminants into the air supply in many clean room environments. Traditional HEPA and ULPA media contain glass fibers with boron as one of the elements within the glass structure.

Traditional HEPA filters, for example, can contain borosilicate microglass fibers, with diameters of about 0.1 to 5.0 $\mu$m with synthetic reinforcing fibers having diameters of 5 to 60 $\mu$m. The synthetic reinforcing fibers can be carbon based polymers which are generally unsuitable for use at high temperatures due to outgassing, flammability, and/or poor retention of tensile strength, e.g., crease strength, under humid conditions. Alternatively, the reinforcing fibers have been fiberglasses, such as E-glass, which contain high levels of boron. Boron contaminants generated from these HEPA filters can be as high as 260 ng/m$^2$ at an air velocity of about 183 fpm. The combination of hydrofluoric acid and/or water from the clean room (relative humidity often greater than 45%) causes the boron within the glass fiber to become air borne as a contaminant, e.g., BF$_3$ or boric acid.

A need therefore exists for the manufacture of a nonwoven glass fiber composite which circumvents the above-identified problems, including the retention of tensile strength and crease strength.

SUMMARY OF THE INVENTION

The present invention circumvents the problems described above by providing a nonwoven glass fiber web, e.g., a composite, which retains particles and/or oil and withstands humid environments without the release of boron based gases typically associated with fiber glass based filtration media. The present nonwoven filter media advantageously has increased resistance to humidity over extended periods of time without significant loss in crease strength. As a consequence, the essentially boron free filtration media of the present invention can be used in environments where temperature and humidity are strictly controlled and the release of boron based contaminants cannot be tolerated such as in clean room environments used to fabricate silicon wafers for microchips and the like.

In a particular embodiment, the filter media of the present invention is a nonwoven filter media composite that includes glass wool fibers essentially free of boron and chopped glass filaments/fibers essentially free of boron. The chopped glass fibers are interspersed throughout the glass wool component, thereby providing structural integrity to the nonwoven filter media. In general, the chopped glass fiber percentage is between about 5% to about 40% based on the total weight and desired efficiency of the composite filter. Typically the glass wool fibers contain less than 0.2% by weight boron, preferably less than 0.1%, most preferably less than about 0.08%. In general, the chopped glass fibers contain less than 1.0% by weight boron, preferably less than about 0.6%, more preferably less than 0.1% and most preferably, no detectable levels of boron, such as boron oxide.

Accordingly, the present invention provides filter media useful for industrial, pharmaceutical and semiconductor applications which have little tolerance for boron based contaminants. The invention also provides filter media which have enhanced filtration performance characteristics.

Other advantages of the invention will be readily apparent to one having ordinary skill in the art upon reading the following description.

All percentages by weight identified herein are based on the total weight of the filter composite, glass wool fibers, or chopped glass fibers unless otherwise indicated. In addition, all stated ranges are understood to be inclusive unless otherwise noted.

BRIEF DESCRIPTION OF THE DRAWINGS

Other objects, advantages and features of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE INVENTION

Figure 1:
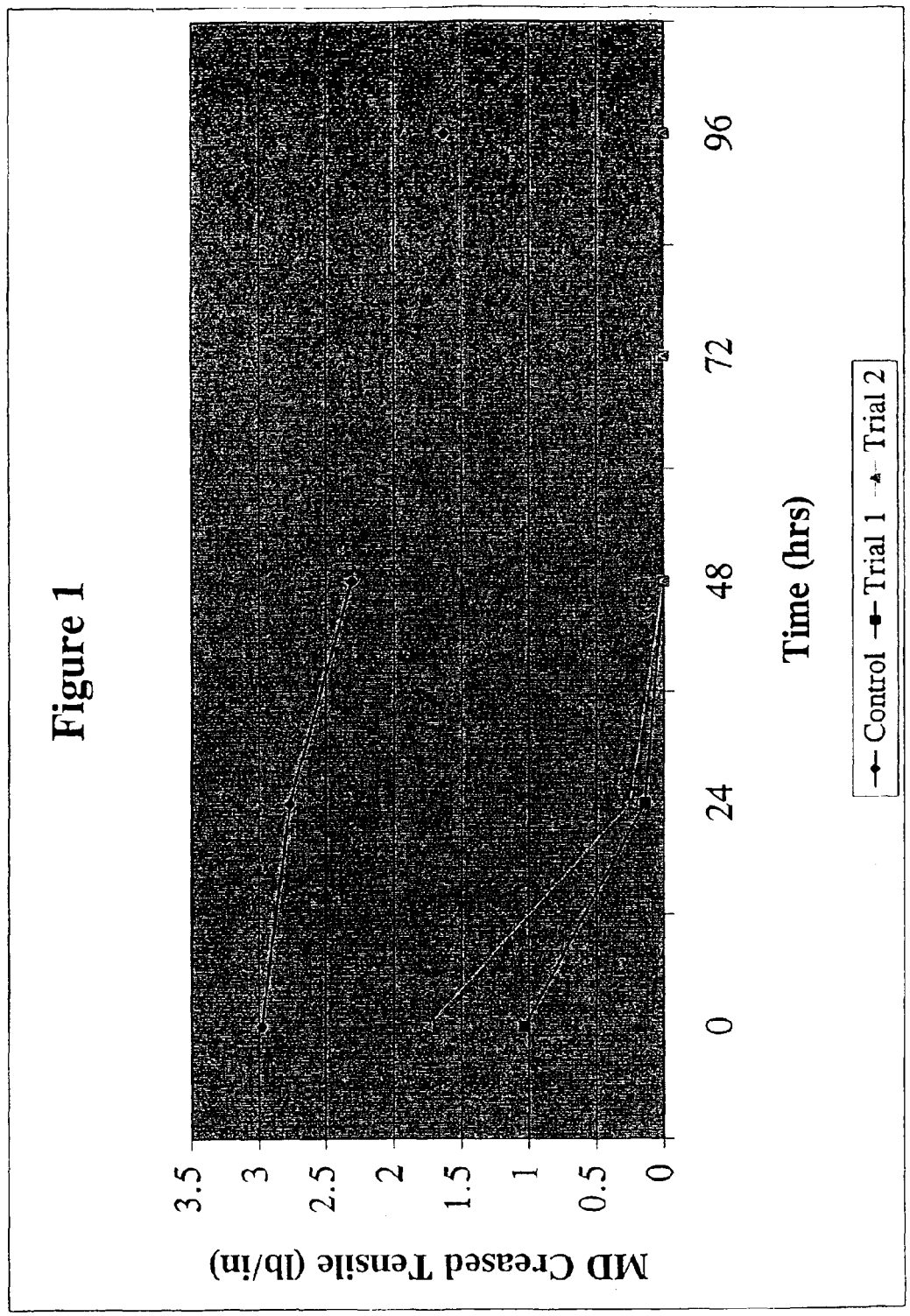
FIG. 1 is a humid aging study which depicts the loss of creased tensile strength in low boron containing glass wool composites with chopped fibers having high amounts of sodium oxide and low amounts of calcium oxide in comparison to a control sample of traditional HEPA media with borosilicate glass wool and E-glass with 4–7% boron content as reinforcing material.

The features and other details of the invention will now be more particularly described and pointed out in the claims. It will be understood that the particular embodiments of the invention are shown by way of illustration and not as limitations of the invention. The principle features of this invention can be employed in various embodiments without departing from the scope of the invention.

The present invention is based, at least in part, on a discovery that the present invention provides filtration media suitable for use in clean rooms which have strict limitations on the levels of air borne boron contaminants. As such, the present invention provides nonwoven filter media composites that include glass wool fibers essentially free of boron and chopped glass fibers essentially free of boron. The chopped glass fibers are interspersed throughout the glass wool, thereby providing structural integrity to the nonwoven filter media and forming the nonwoven composite structure. In general, the weight percentage of chopped glass fiber is between about 5% to about 40%, e.g., 10–35%, 15–30%, 20–30%, 20–25%, based on the total weight of the composite filter which can include additional components to selectively alter the characteristics of the nonwoven composite. Suitable additives included in the nonwoven composite can include binders, surfactants, water repellents, coupling agents, antifungal agents, dyes, and crosslinking agents known to those skilled in the art.

The term "nonwoven" is recognized by those skilled in the art and is intended to include those sheet or web structures made by bonding or entangling fibers or filaments by mechanical, thermal or chemical means. Because the fibers do not need to be converted to yarn which is knitted or woven, nonwoven materials can be manufactured more rapidly and economically, per foot of material, than traditional wovens.

The glass fiber components of the nonwoven filter media, i.e., the glass wool and chopped glass portions of the filter media, are essentially free of boron. The term "essentially free" means that the composition contains at most only a trace quantity of a specific component such as boron, e.g., from impurities in the raw materials used to produce the glass fibers. Generally, the glass wool fibers contain less than 0.2% by weight boron, preferably less than about 0.1%, more preferably less than about 0.08% and most preferably no detectable levels, e.g., about 0% boron, e.g., boron oxide. In general, the chopped glass fibers contain less than 1.0% by weight boron, preferably 0.6% and more preferably no detectable levels of boron, e.g., about 0% boron, e.g., boron oxide.

Glass wool fibers having little to no boron contaminants are known to those skilled in the art and many are commercially available. For example, U.S. Pat. Ser. Nos. 5,789,329; 4,542,106; 4,396,722; 4,199,364; 4,166,747; 4,026,715; 3,876,481; 3,929,497; 3,847,627; 3,847,626; and British Patent Specification 520,427 describe suitable low boron containing glass fibers useful in the nonwoven composites of the present invention. Commercially available "essentially boron free" glass fibers useful in the nonwoven composites of the present invention are available from Evanite Fiber Corporation, (1551 S.E. Crystal Lake Drive, Post Office Box E, Corvallis, Oreg. 97339-0598, product numbers 800 series), Lauscha Fiber International, GmbH, (Dammweg 35, 98724 Lauscha, Germany, Product A glass, also 105 Easport Lane Summterville, S.C., 29483), Nanjing Fiberglass Research & Design Institute (30 AmDeLi, West Yu Hua Road, Nanjing, 210012, China), and Thuringer Filter Glas GmbH & Co, KG (98743 Spechtsbrunn, Germany, Sanneberger Strasse 41).

In one embodiment, the glass wool fibers suitable for use in the nonwoven filter media composites of the present invention have an average diameter of between about 0.1 microns and about 5.0 microns, preferably between about 0.4 microns and about 1.0 microns, and most preferably between about 0.55 and about 0.75 microns ($\mu$m). The length to diameter ratio (l/d) of the glass wool fibers is generally between about 100 to about 10,000 (l/d), preferably between about 50 and 2500, and most preferably about 300 (l/d).

The glass wool fibers useful in the nonwoven composites of the invention are generally composed of a mixture of silicon dioxide ($SiO_2$), aluminum dioxide ($Al_2O_3$), iron oxide(s) ($FeO$, $Fe_2O_3$), less than about 0.1% boron (boron oxide as well as other boron contaminants typically found in fiber glass compositions), sodium oxide ($Na_2O$), potassium oxide ($K_2O$), calcium oxide ($CaO$), magnesium oxide ($MgO$), barium oxide ($BaO$) and zinc oxide ($ZnO$) and various trace elements and/or their oxides, e.g., titanium dioxide ($TiO_2$, $ZrO_2$, $Cr_2O_3$, fluorine, sulfates, etc.). It should be apparent to those having ordinary skill in the art that these glass compositions can include impurities of each metal oxide where the valencies are less than or more than the true oxide. For example, the following formulae provide for metal oxides that are included within the scope of the compositions of the invention. The formulae include:

$M_n(O)_{n+1}$ wherein n is positive value greater than zero;

$M_n(O)_n$ wherein n is a positive value greater than zero;

$M_n(O)_{n-1}$ wherein n and n−1 are positive values greater than zero;

and wherein the values of n+1, n, and n−1 are integer values or fractions thereof; and M is a metal capable of forming a metal oxide, e.g., Si, Al, Fe, Na, K, Ca, Mg, Mn, Zn, Ti, Zr, Cr, Ba, B, etc.

In a preferred embodiment, the glass wool fibers have less than about 70% $SiO_2$ by weight, less than about 7% $Al_2O_3$, less than about 0.5% iron oxides, less than about 0.2% boron, less than about 15% sodium oxide, less than about 7% potassium oxide, less than about 10.0% calcium oxide, less than about 5% magnesium oxide, less than about 10% barium oxide, and less than about 5% zinc oxide by weight.

In a most preferred embodiment, the glass wool fibers have between about 62% and about 69% $SiO_2$, between about 2.5% and about 6.5% $Al_2O_3$, less than about 0.2% iron oxides, less than about 0.08% boron, between about 8.5% and about 12.5% sodium oxide, between about 2.5% and about 7.0% potassium oxide, between about 4.0% and about 6.0% calcium oxide, between about 2.5% and about 5.0% magnesium oxide, between about 0% and about 9.5% barium oxide, and between about 0.5 and about 3.0% zinc oxide by weight.

Chopped glass wool fibers having little to no boron contaminants are known to those having ordinary skill in the art and many are commercially available. Commercially available "essentially boron free" chopped glass fibers useful in the nonwoven composites of the present invention are available from Pittsburgh Plate and Glass (PPG Industries, One PPG Place, Pittsburgh, Pa. 15272) under the trademark "ZB" and from Owens-Corning (Owens Corning, One Owens Corning Parkway, Toledo, Ohio 43659) under the trademark "ADVANTEX."

In one embodiment, the chopped glass fibers suitable for use in the nonwoven filter media composites of the present invention have an average diameter of between about 5.0 microns and about 9.0 microns, preferably having an average diameter between about 6.0 microns and about 7.0 microns, and most preferably having an average diameter of about 6.5 microns. The chopped glass fibers are precision cut to specified lengths ranging from 1/16 inch to about 2 inches, preferably between about 1/8 inch and about 1 inch and most preferably between about 0.25 inch to 0.50 inch. Typically the chopped glass fibers are enmeshed within the glass wool fibers between about 5% and 40%, more preferably between about 10% and about 35%, and most preferably between about 15% and 30% based on the total weight of the nonwoven composite. The chopped glass fibers are produced as a continuous filament, which is treated with a sizing agent, e.g., starch, and precision cut to a specified length as detailed above. The chopped glass filaments can be obtained as a dried material with very little moisture content or can contain up to 25% moisture, based on weight of total fiber.

The chopped glass fibers useful in the nonwoven composites of the invention are generally composed of a mixture of silicon dioxide ($SiO_2$), aluminum dioxide ($Al_2O_3$), less than about 1% boron, iron oxide(s) (FeO, $Fe_2O_3$), sodium oxide ($Na_2O$), potassium oxide ($K_2O$), calcium oxide (CaO), magnesium oxide (MgO) and various trace elements and/or their oxides, e.g., titanium dioxide ($TiO_2$, fluorine, sulfates, etc) by weight. It should be apparent to those having ordinary skill in the art that these glass compositions can include impurities of each metal oxide where the valencies are less than or more than the true oxide. For example, the following formulae provide for metal oxides that are included within the scope of the compositions of the invention. The formulae include:

$M_n(O)_{n+1}$ wherein n is positive value greater than zero $M_n(O)_n$ wherein n is a positive value greater than zero $M_n(O)_{n-1}$ wherein n is a positive value greater than zero, n−1 is a positive value, wherein the values of n and n−1 are integer values or fractions thereof; and M is a metal, e.g., Si, Al, Fe, Na, K, Ca, Mg, Mn, Zn, Ti, Zr, Cr, Ba, B, etc.

Preferably the content of calcium oxide and aluminum oxide in the chopped wool fiber is increased relative to the sodium and potassium oxides such that the amount of sodium oxide and potassium oxide is reduced to a point which is essentially free of the sodium and potassium oxides, e.g., less than 1%. The increase in the calcium and aluminum oxides and the decrease in sodium and potassium oxides increases the ability o the nonwoven components to withstand degradation/release of contaminants in humid environments.

In a preferred embodiment, the chopped glass fibers have between about 55% and about 65% $SiO_2$, between about 10% and 15% $Al_2O_3$, between about 0% and less than about 1% boron, less than about 1% iron oxides, less than about 2% sodium oxide, less than about 3% potassium oxide, between about 20 and about 25% calcium oxide and less than about 5% magnesium oxide by weight.

In a most preferred embodiment, the chopped glass fibers have between about 59% and about 60% $SiO_2$, about 13% $Al_2O_3$, less than about 0.6% boron, less than about 0.5% iron oxides, less than about 1.0% sodium oxide, less than about 0.5% potassium oxide, between about 21% and about 23% calcium oxide, and less than about 4.0% magnesium oxide by weight.

| | Microfiberglass Wool | | Chopped Filament Glass | | |
|---|---|---|---|---|---|
| Component % | Borosilicate Glass | Boron Free Glass | E Glass | Chem Glass | Boron Free Glass |
| $SiO_2$ | 55–65 | 55–70 | 50–60 | 65–75 | 55–65 |
| $Al_2O_3$ | 4.5–7.5 | 3–7 | 14–16 | 5–9 | 10–15 |
| $Fe_2O_3$ | <0.2 | <0.5 | <1.0 | | <1 |
| $B_2O_3$ | 9–11 | <0.2 | 4–7 | | <1 |
| $Na_2O$ | 7.5–11.5 | 7.0–15.0 | | <15 | <2 |
| $K_2O$ | 1.0–4.5 | 2.0–7.0 | <2 | <10 | <3 |
| CaO | 0.5–4.5 | 3–10 | 15–25 | | 20–25 |
| MgO | <2.5 | 1–5 | <6 | <6 | |
| BaO | 2.0–6.5 | <10 | | | |
| ZnO | <6 | <5 | | | |
| $F_2$ | <2 | | <2 | | |
| $SO_3$ | <0.2 | | | | |
| $TiO_2$ | | | | | |

The nonwoven web basis weight of the composite glass fiber web will vary depending upon the requirements of a given filtering application. In general, higher web basis weights yield better filtration, but there exists a higher resistance, or pressure drop, across the filter barrier when the filter media has a higher basis weight. In general, filtration efficiency can be increased by either increasing the weight of the filter medium or reducing the average fiber diameter of the filter medium. As the efficiency increases, the resistance, or pressure drop across the media, also increases.

For most applications the web basis weight can be in the range of between about 15 to about 150 g/m$^2$. Preferably the web weight is in the range of between about 30 to about 115 g/m$^2$, and, more preferably, between about 25 to about 90 g/m$^2$. One of ordinary skill in the art can readily determine the optimal web basis weight, and fiber diameter by considering such factors as the desired filter efficiency and permissible levels of resistance. Furthermore, the number of plies of the polymer fiber web used in any given filter application can also vary from approximately 1 to 10 plies. One of ordinary skill in the art can readily determine the optimal number of plies to be used.

The nonwoven filter media composite can further include a polymeric binder or binders. Suitable binders include acrylic and styrene-acrylic binders known to those skilled in the art. For example, suitable binders include nonionic acrylic ester polymer latices, such as Rhoplex HA-8 or Rhoplex HA-16 (Rohm & Haas Co., Independence Mall West, Philadelphia, Pa., 19105); anionic acrylic ester polymer latices such as Hycar 26552 or Hycar 26138 (B.F. Goodrich Company, 6100 Oak Tree Boulevard, Cleveland, Ohio, 44131); water soluble acrylic ester/acrylic acid co-polymer latices such as Carboset 552 (B.F. Goodrich); anionic styrene-acrylic ester co-polymer latices, such as Hycar 26915 (B.F. Goodrich); anionic polyurethane latices, such as U50 (B.F. Goodrich); anionic polyvinyl chloride latices, such as Hycar 460 X75 (B. F. Goodrich); and cationic acrylic ester polymer latices, such as Voncoat SFC-55 or Voncoat SFC-300 (Dainippon Ink and Chemicals, Inc., 3-7-2-, Nihonbashi, Chuo-Ku, Tokyo, Japan).

The binder coats the fibers and is used to adhere the fibers to each other at points of contact, thereby facilitating adhesion between the intertwined glass wool fibers and chopped glass fibers. The binder, therefore, facilitates the media to remain porous. In general, the binder, if present in the nonwoven composite, is between about 2 and 10%, preferably between about 3 and about 9%, and most preferably between about 4% and 7% of the total composite weight.

The nonwoven filter media composite can also include a water repelling agent or agents. Suitable water repelling agents include slightly cationic perfluoroalkyl acrylic ester polymer latices, for example, FC-280, FC-6101 or FC-5102 (Commercial Chemical Division, 3M, 223-6SE, 3M Center, St. Paul, Minn., 55144); Aquafilm T (C.N.C. International, Inc., 20 Privilege Street, Woonsocket, R.I., 02895) or non-ionic perfluoroalkyl acrylic ester polymer latices, such as Zonyl NWA (DuPont Performance Chemicals, Chamber Works Deepwater, N.J., 02895). The water repellent functions as a fiber surface modifier, reducing surface tension of the fiber and increasing the contact angle between the fiber and water droplets. In general, the water repellent, if present in the nonwoven composite, is between about 0.01% and 5%, preferably between about 0.05 and about 3%, and most preferably between about 0.1% and 2% of the total composite weight.

Additionally, the nonwoven filter media composite can also include a surfactant or surfactants. Suitable surfactants include nonionic, amphoteric, anionic and cationic surfactants known to those skilled in the art. Illustrative examples of suitable surfactants include fluoroaliphatic surfactants, e.g., perfluoroalkyl polyalkylene oxides; and other surfactants, e.g., actylphenoxypolyethyoxy ethanol nonionic surfactants, alkylaryl polyether alcohols, and polyethylene oxides. Commercially available surfactants suitable for the present invention include various poly(ethylene oxide) based surfactants available under the tradename Triton, e.g., grade X-102, from Rohm and Haas Corp; various polyethylene glycol based surfactants available under the tradename Emerest, e.g., grades 2620 and 2650, from Emery Industries; polyalkylene oxide fatty acid derivatives available under the tradename PEG, e.g. PEG 400, which is available from ICI; sorbitan monooleate, e.g., Span 80, which is available from ICI; ethoxylated hydroxylated castor oil, e.g., G1292, which is available from ICI; a mixture of sorbitan monooleate and ethoxylated hydroxylated castor oil, e.g., Ahcovel Base N62, which is available from ICI; polyoxyalkylene modified fluoroaliphatic surfactants which are available, e.g., from Minnesota Mining and Manufacturing Co.; amphoteric-modified ethoxylated alkylamines, such as Schercopol DS-120 (Scher Chemicals, Inc., P.O. Box 4317, Clifton, N.J., 07012); non-ionic-polyethoxylene(2) sorbitan monooleate, such as Alkonal 6112 (DuPont, Chemicals and Pigments Division, Performance Products, Wilimington, Del., 19898), and mixtures thereof.

Coupling agents can also be added to the filter media composition. Suitable coupling agents include organofunctional silanes, such as amino functional silanes, Z-6020, Z-6026, Z-6030 and Z-6032, carboxy functional silanes, such as Z-6030, or epoxy functional silanes, such as Z-6040 (Dow Corning Corporation, Midland, Mich., 48686-0994). Generally, between about 0.01% and about 1.0% of coupling agent is added to the composite filter media. The coupling agent serves to strengthen the composite material.

A crosslinking resin can, optionally, be added to the filter media composition. A typical crosslinking resin is melamine-formaldehyde, such as Berset 2003 (Bercen, Inc., Cranston Street, Cranston, R.I., 02920-6789). The crosslinking agent, if present, if found in the composite material in a range of between about 0.01% and about 2.0%. The crosslinking agent serves to strengthen the composite material.

The surfactant is generally used to improve the dispersion of fibers in water and/or to improve the stability of the resin formulations. In general, the surfactant, if present in the nonwoven composite, is between about $1\times10^{-5}$ and 1.0%, preferably between about $5.0\times10^{-5}$ and about 0.1%, and most preferably between about $1\times10^{-4}$ and about 0.005% of the total composite weight.

Filter performance is evaluated by different criteria. It is desirable that filters, or filter media, be characterized by low penetration across the filter of contaminants to be filtered. At the same time, however, there should exist a relatively low pressure drop, or resistance, across the filter. Penetration, often expressed as a percentage, is defined as follows:

$$Pen = C/C_0$$

where C is the particle concentration after passage through the filter and $C_0$ is the particle concentration before passage through the filter. Filter efficiency is defined as $$100 - \% \text{ Penetration.}$$

An exemplary challenge employs creased tensile testing. A procedure to measure creased tensile strength of filter media can be conducted as follows.

The creased tensile strength test is based on a known procedure, TAPPI T 494 "Tensile breaking properties of paper and paperboard (using constant rate of elongation apparatus)". A 1 inch by 6 inch sample is cut with the length being in the machine direction. The sample is folded end to end over a straight edge. A two inch×¼ inch metal circular disk is placed on top of the fold and a ten pound weight is placed on top of the disk and creased media for fifteen minutes. The weight is removed after 15 minutes and the material is squarely clamped in the jaws of a device suitable for tensile measurement. The tensile strength is measured in pounds per inch (lb/inch) or (KN\m) and the breaking length is measured in percent elongation. This test demonstrates that the present invention provides composite materials with crease strengths equivalent to industry accepted standard materials (that do not have low boron containing fiber media) even at increased humidity level as well as other environmental factors. Thus the crease strength of the present invention provides an advantage over presently available boron containing media.

In preferred embodiments, the filter composites of the invention have crease tensile strength values of at least about 1.0 lb/inch, preferably at least about 1.75 lb/inch and most preferably at least about 2.5 lb/inch. In general, these crease tensile values diminish only slightly, about less than 70%, preferably about less than 60%, and most preferably, about less than 50% over a period of 48 hours. Preferably, the crease tensile strength does not diminish considerably over a period of 96 hours, more preferably over 168 hours, and most preferably over an indefinite period of time, e.g., weeks. In contrast, commercially available materials currently available do not meet these criteria and have a crease tensile strength of only about 1.25 lb/inch which is depleted within 48 hours.

One of ordinary skill in the art will recognize the need to balance particle penetration across a filter with the resistance to which the filter is subjected during filtration. The glass wool fibers and chopped glass fibers used according to the present invention as well as the compositions of these glass components can be varied to achieve optimal performance for filter media required in clean room applications.

Two well-known manufacturing techniques for nonwoven webs include the wet laid and the dry laid processes. In a wet laid process, fibers are suspended uniformly in water at very high dilutions of 0.01 to 0.5% by weight of fiber. The fiber and water solution is directed to a filter or screen which can be in the form of a wire belt in an inclined position or a cylinder. As the water drains through the filter, the fibers are laid down in a random orientation with respect to each other to provide a loose web. The web is then squeezed between rollers to remove additional water, and dried by passing it through an oven or over drying cans. The wet laid process permits adding chemicals, binders, and colorants before or after the web is formed. It also permits uniform blending of different fibers and provides a nonwoven with isotropic properties.

The dry laid process includes steps of air laying and carding. Air laying begins by suspending the fibers in air, then collecting them as a sheet on a screen. Fiber deposition onto the screen can be done in a free-fall manner or with the aid of compressed air and/or suction. In a carding step, rotating drums covered with fine wires and teeth comb the fibers into parallel arrays to impart anisotropic properties to the web.

Wet laid and dry laid techniques are well known for manufacturing an enormous range of paper, synthetic, and glass products with varying compositions. Although relatively rapid and inexpensive to manufacture, these products are only suitable for environments and applications that are not generally contacted with harsh chemicals, such as boron, boronic acid, boron trifluoride, hydrofluoric acid, and/or humid conditions.

The nonwoven glass composites of the invention can be prepared by processes known to those skilled in the art, such as those described above. For example a slurry is formed by combining acidified fresh, filtered, clean water, low boron chopped fibers, and low boron microfiberglass wool fibers, in a hydropulper. In one aspect, the temperature of the water is maintained between about 40° F. and about 100° F., preferably between about 65° F. and about 85° F. Typically the pH of the slurry is between about 2.2 and about 3.2, preferably between about and about 2.6. In general, between about 10 pounds and about 250 pounds, preferably between about 50 and about 200 pounds of chopped fibers and between about 50 pounds and about 750 pounds of microfiberglass wool fibers are added to between about 1900 and about 11,400 liters of pH adjusted water.

Additives such as binders, synthetic organic fibers, and viscosity modifiers may also optionally be added.

The fibers are dispersed in the hydropulper for about 15 minutes. This slurry is then diluted with additional water such that the final weight percent of fiber is between about 0.2% and about 2.0%. The slurry is then passed through centrifugal cleaners to remove unfiberized glass or shot. The slurry may or may not be passed through additional equipment such as refiners or deflakers to further enhance the dispersion of the fibers. Care must be taken to minimize the work done to the fiber. Glass fibers are very brittle and excess fiber shortening should be avoided.

The slurry is then passed over standard web forming equipment at a rate of between about 30 g/m$^2$ and about 115 g/m$^2$. Excess water is removed by gravity and vacuum assisted drainage. A low level of binder is added to the fiber in the wet web or green state.

The wet formed web is then passed over a series of drum dryers to dry at a temperature of between about 250° F. and about 350° F., preferably between about 275° F. and about 325° F. Typical drying times vary until the moisture content of the composite fiber is between about 0% and about 0.5%.

The following examples serve to further described the invention.

EXAMPLES

Example 1

A series of trials were run in the following manner:

A slurry was formed by combining 4000 liters of fresh, cleaned water for which the temperature was adjusted to between 75 and 100° F. and the pH was adjusted to between 2.3 and 2.9 with between 70 and 90 kg of chopped glass reinforcement fibers to a percentage solids of between 1.8 and 2.4% in a hydropulper. The slurry was circulated for between 2 and 15 minutes. Between 140 kg and 160 kg of glass microfiber wool and 7600 liters additional water was added to the slurry to a percentage solids of about 2.0% and circulated for between 2 and 15 minutes. This slurry was then transferred to a holding chest with an additional 12,000 liters of water added to for a final percent solids of about 1.0%. The stock from this slurry provided the main flow to the paper machine.

A second slurry was formed by combining 9500 liters of fresh, cleaned water for which the temperature was adjusted to between 75 and 100° F. and the pH was adjusted to between 2.3 and 2.9. Between 45 and 90 kg of glass microfiber wool was added to the water for a percentage solids of between 0.5 and about 1.0% in a hydropulper. The slurry was circulated for between 2 and 10 minutes. The stock from this slurry provided a secondary flow to the paper machine.

The stock slurries prepared above were then passed through a series of centrifical cleaners to remove unfiberized glass or shot and onto the forming wire of the paper machine. 5% of binder, based on combined weight of fibers, consisting of a formulation of acrylic ester polymer latex, styrene-acrylic copolymer was added to the wet web. 0.1% of polyethoxylated alkyl surfactant, based on total volume of slurry, was added to the wet web and 1.5% fluoroacrylic polymer water repellant, based on total volume of slurry was applied while the web was in its wet formed state such that the web retained between 4 and 7% binder after drying and excess water was removed by gravitational drainage and additional vacuum assisted drainage. The wet formed web was then carried through a series of dryer drums for final drying. Creased tensile strength measurements were conducted as described above.

Humid aging of samples was conducted as follows. A tensile strength strip was placed into a sealed chamber which contained a water vapor saturated environment and maintained at 50° C. for a period of time. Samples were removed at 24, 48, 72 and 96 hours for humid aged crease tensile strength tests, tensile, and percent elongation tests.

Trial number 1, composite sample, had an ULPA efficiency of 99.9999% minimum efficiency on MPPS (most penetrating particle size) when tested at 2.5 cm/sec air face velocity. The sample had an average binder content of between 5 and 6%, with between about 28 and 32% low boron chopped fiber, e.g, less than 1.0% boron, i.e. no boron dectected in chopped fiber used in this trial.

Trial numbers 2, 3 and 7, composite samples, had an ULPA efficiency of 99.999% minimum efficiency on MPPS when tested at 2.5 cm/sec air face velocity. The samples had an average binder content of between 4.5 and 6.5%. Trial 2 had between 20 and 25% chopped fiber, trial 3 had between 28 and 32% chopped fiber and trial 7 had between 18 and 22% low boron chopped fiber, e.g., less than 1.0% boron, i.e., no boron detected in chopped fiber used in these trials.

Trial numbers 4 and 6, composite samples, had an ULPA efficiency of 99.9995% minimum efficiency on MPPS when tested at 2.5 cm/sec air face velocity. The samples had an average binder content of between 4.5 and 6.0%. Trial 4 had between 26 and 30% chopped fiber and trial 6 had between 18 and 22% low boron chopped fiber, e.g., less than 1.0% boron, i.e., no boron detected in chopped fiber used in these trials.

Trial number 5, a composite sample, had an ULPA efficiency of 99.99995% minimum efficiency on MPPS when tested at 2.5 cm/sec air face velocity. The sample had an average binder content of between 4.5% and 6.0%, with between about 22 and 28% low boron chopped fiber, e.g., less than 1.0% boron, i.e., no boron detected in chopped fiber used in this trial.

Trial number 8, a composite sample, had an ULPA efficiency of 99.995% minimum efficiency on MPPS when tested at 2.5 cm/sec air face velocity. The sample had an average binder content of between 4.5% and 6.0%, with between about 12 and 18% low boron chopped fiber, e.g., less than 1.0% boron, i.e., no boron detected in chopped fiber used in this trial.

Figure 2:
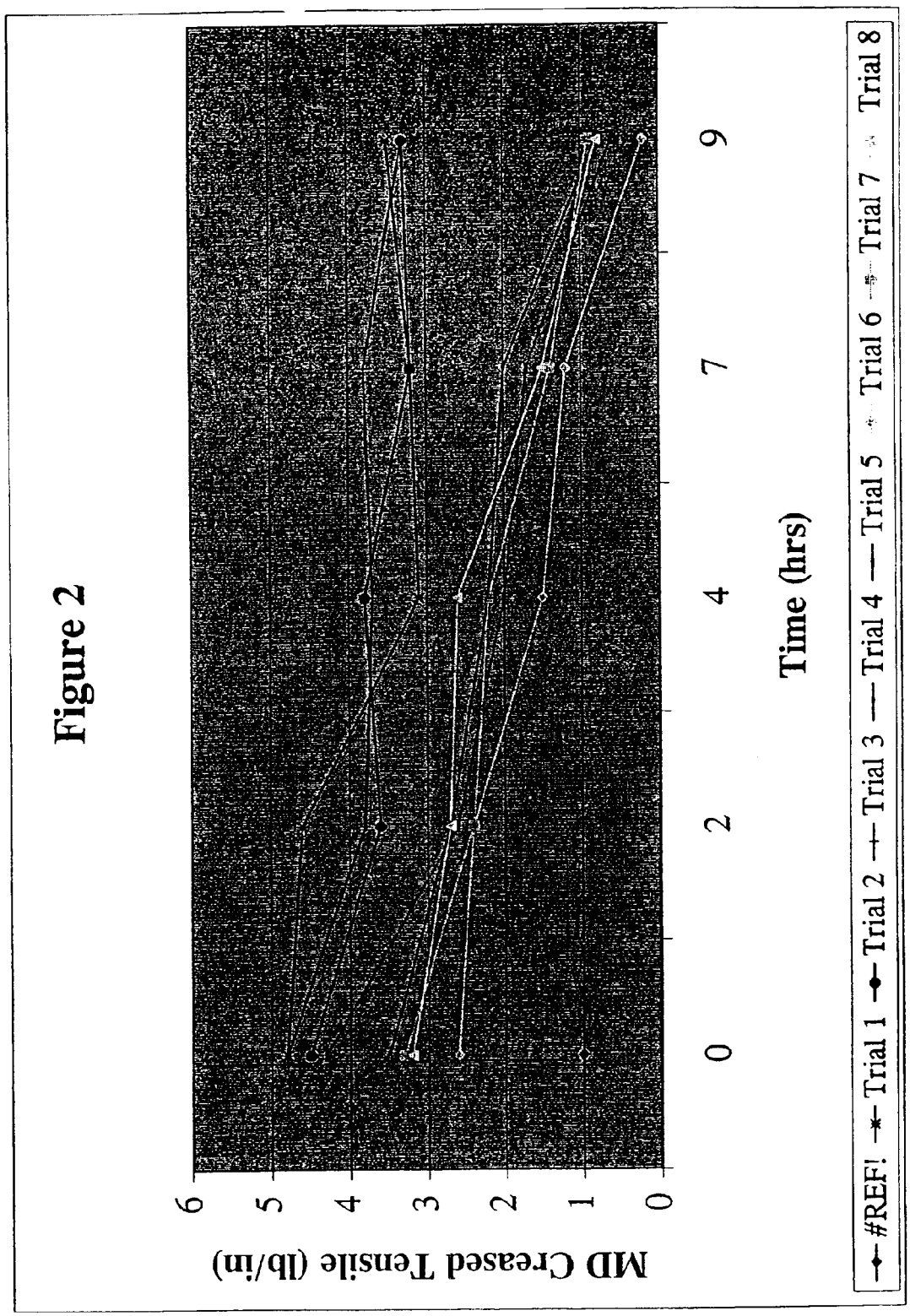
FIG. 2 is a humid aging study of eight trial samples which depicts creased tensile strength in low boron containing glass wool composites with chopped fibers having low boron content in comparison to a control sample of traditional HEPA media with borosilicate glass wool and E-glass with 4–7% boron content as reinforcing material.
Figure 5:
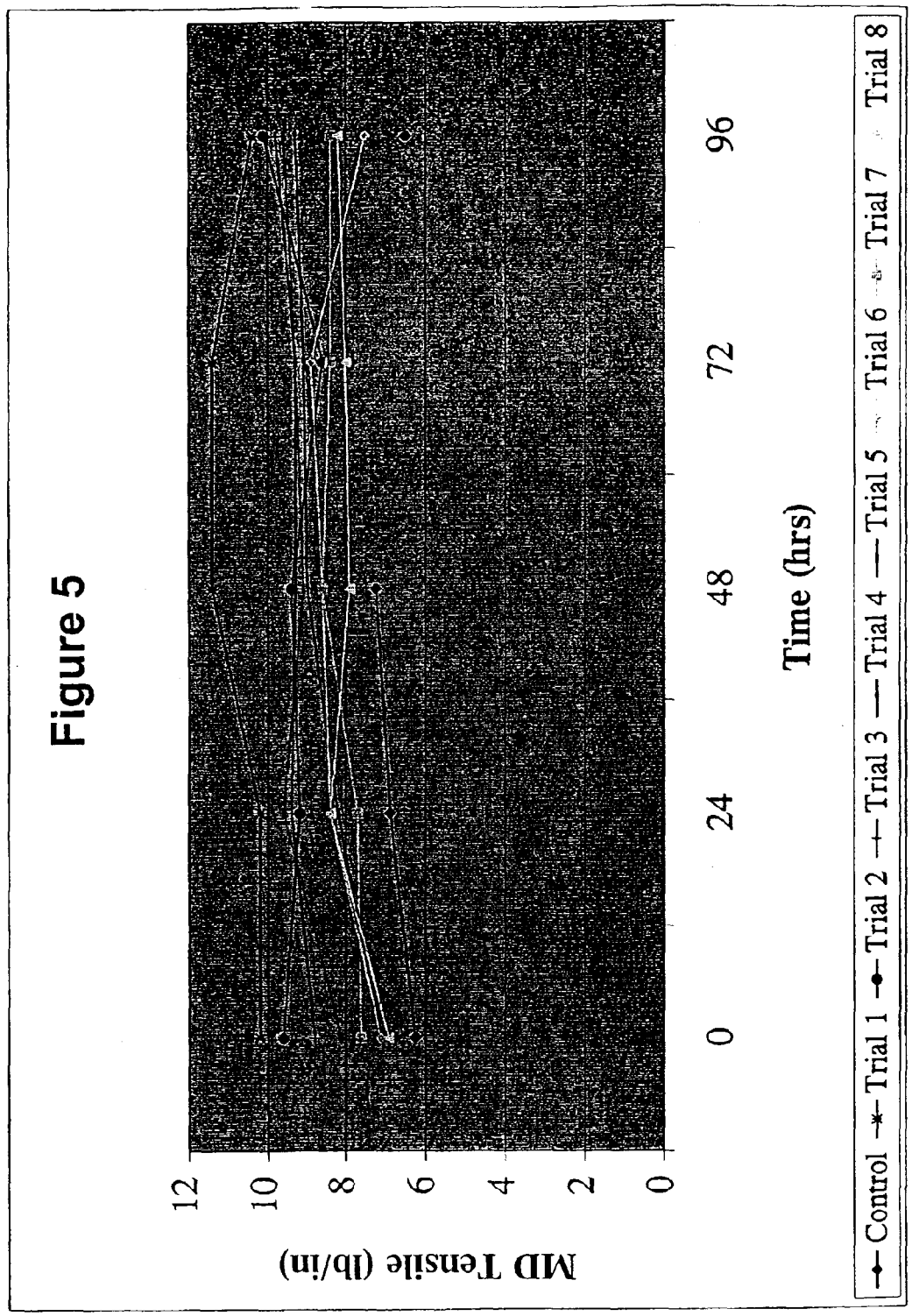
FIG. 5 is a humid aging study of eight low boron containing glass wool/chopped glass fiber composites trial samples demonstrating tensile strength in comparison to a control sample of traditional HEPA media with borosilicate glass wool and E-glass with 4–7% boron content as reinforcing material.
Figure 8:
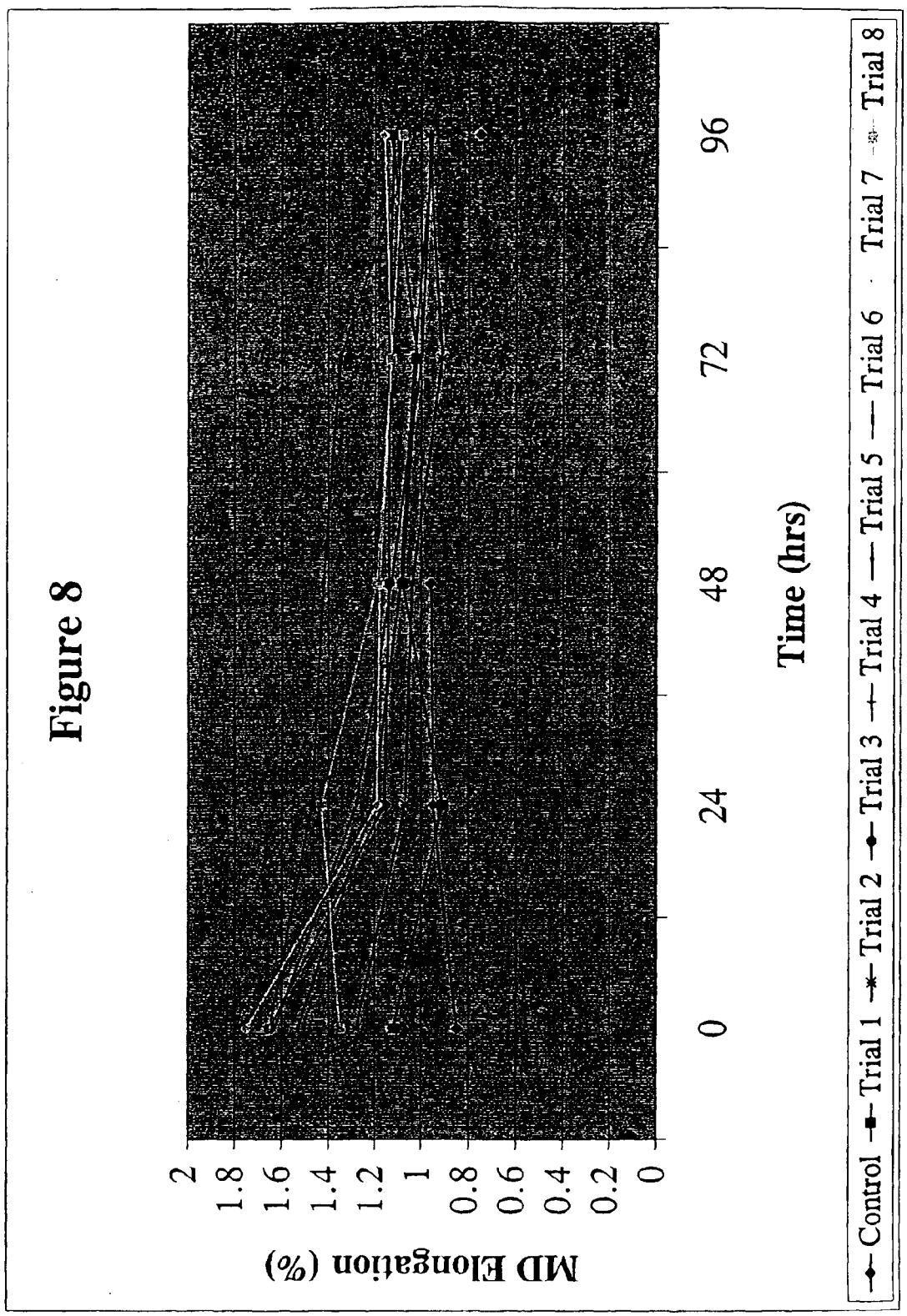
FIG. 8 is a humid aging study of eight low boron containing glass wool/chopped glass fiber composites trial samples demonstrating percent elongation in comparison to a control sample of traditional HEPA media with borosilicate glass wool and E-glass with 4–7% boron content as reinforcing material.

The Humid Aging results for this series of trials (1 through 8) is provided in FIGS. 2, 5 and 8. Data from a standard glass fiber composition prepared from 80 and 85% Evanite B or Manville 475 (boron content of approximately 10.5%), 15 and 20% E glass, and additives as in Example 2, below, is provided for comparison. The standard glass media also contained between 0.5 and about 4% polyester reinforcement fiber with an average organic content between about 1 and 10.0%. The data was quite variable, however, these trials maintained some crease tensile strength over the time of testing and half the trials were superior to the control.

Example 2

Figure 3:
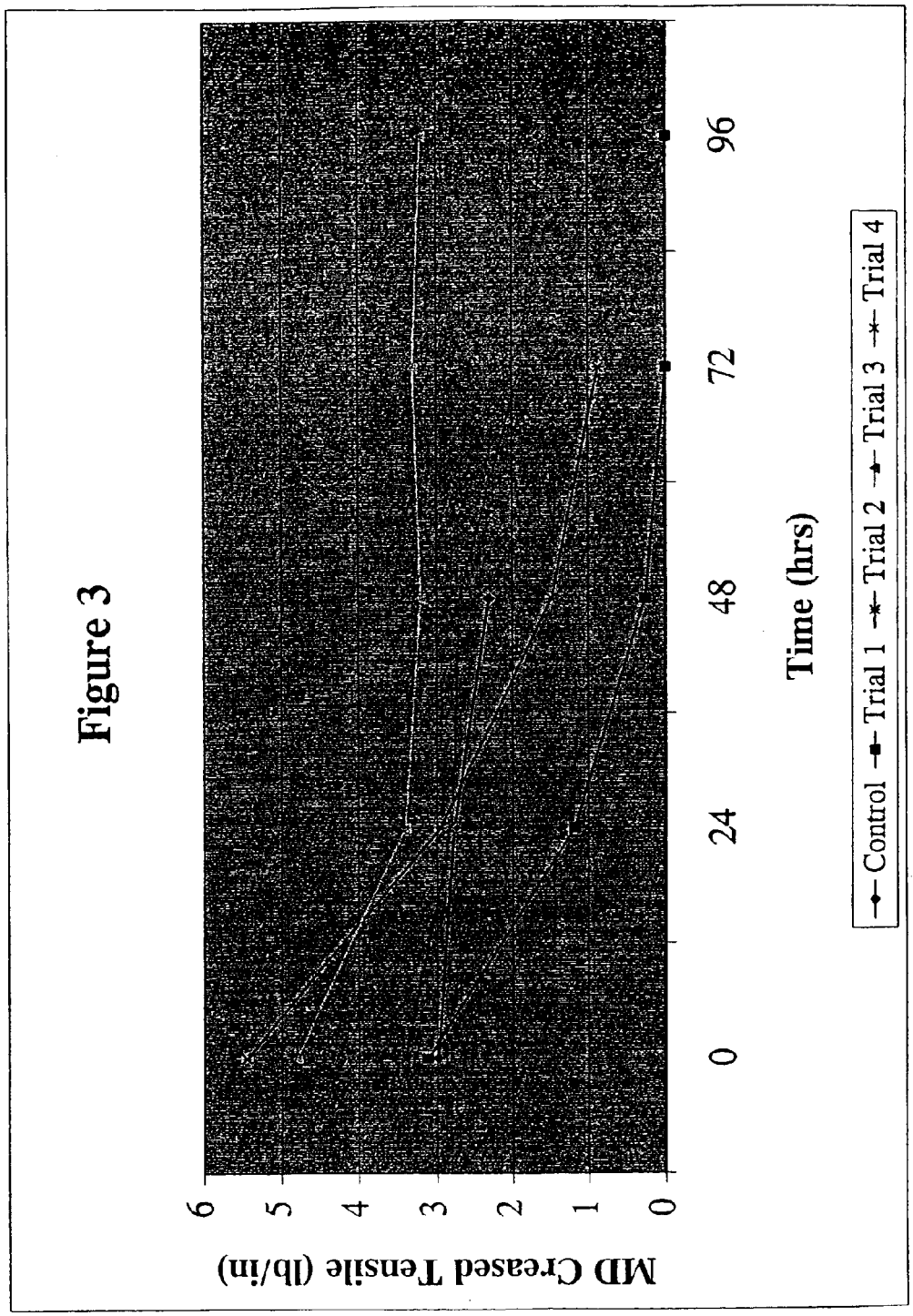
FIG. 3 is a humid aging study of three trial samples which incorporate different binders than in FIG. 2 and which depicts creased tensile strength in low boron containing glass wool composites with chopped fibers having low boron content in comparison to a control sample of traditional HEPA media with borosilicate glass wool and E-glass with 4–7% boron content as reinforcing material.

A second series of trials was made in the same manner as Example 1. These trials were made with a binder consisting of a nonionic acrylic ester latex and a water soluble acrylic ester, acrylic acid copolymer, a cationic fluoroacrylic polymer fluorocarbon water repellant at the same levels as Example 1, such that the web retained between 4 and 7% binder after drying. The Humid Aging results for these series of trials is given in FIG. 3. Two out of three of the trials showed similar humid aging to the control which was composite of Manville 475 and E glass chopped strands described above. One trial did show a loss over the test time, but retained some strength up to 48 hours.

Trial number 1, a composite sample, had an ULPA efficiency of 99.9995% minimum efficiency on MPPS when tested at 2.5 cm/sec air face velocity. The sample had an average binder content of between 4.5 and 6.5%, with between about 15 and 22% low boron chopped fiber, e.g., less than 1.0% boron, i.e., no boron detected in Chem glass chopped fiber used in this trials.

Trial numbers 2 and 3, composite samples, had an ULPA efficiency of 99.9995% minimum efficiency on MPPS when tested at 2.5 cm/sec air face velocity. The samples had an average binder content of between 4.5 and 6.5%, with between about 15 and 22% low boron chopped fiber, e.g., less than 1.0% boron, i.e., no boron detected in chopped fiber used in these trials.

Trial number 4, a composite sample, had an ULPA efficiency of 99.9985% minimum efficiency on MPPS when tested at 2.5 cm/sec air face velocity. The samples had an average binder content of between 4.5 and 6.5%, with between about 15 and 22% low boron chopped fiber, e.g., less than 1.0% boron, i.e., no boron detected in chopped fiber used in this trial.

Figure 6:
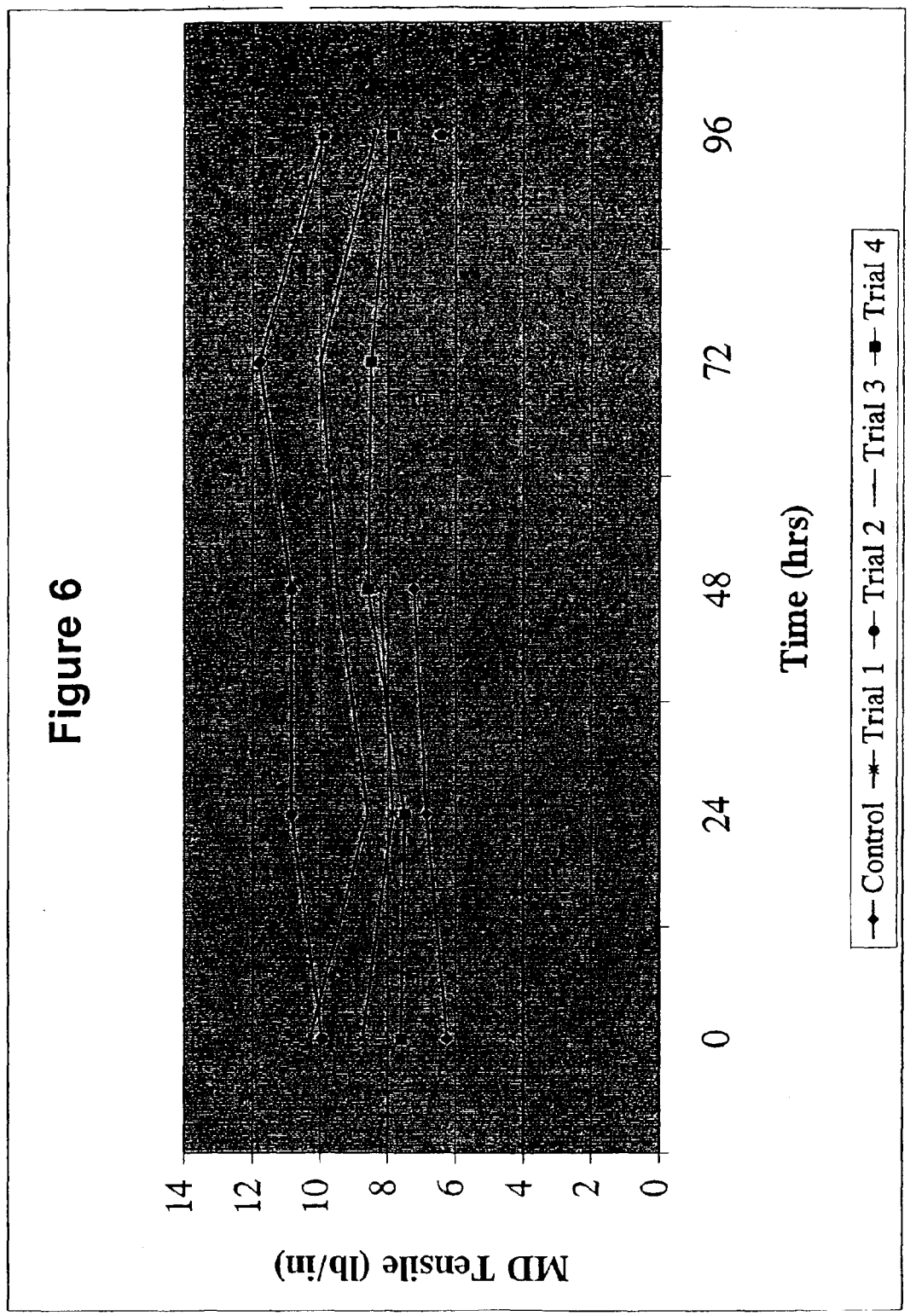
FIG. 6 is a is a humid aging study of three low boron containing glass wool/chopped glass fiber composites trial samples which incorporates different binders than in FIG. 5 demonstrating tensile strength in comparison to a control sample of traditional HEPA media with borosilicate glass wool and E-glass with 4–7% boron content as reinforcing material.

FIGS. 5 and 6 show MD (machine direction) tensile strengths for Examples 1 and 2. The results indicate that the low boron containing composites retain tensile strength and, in general, showed improved tensile strength over the high boron containing control sample after humid aging (described above, zero point at zero hours in the dried state).

Figure 9:
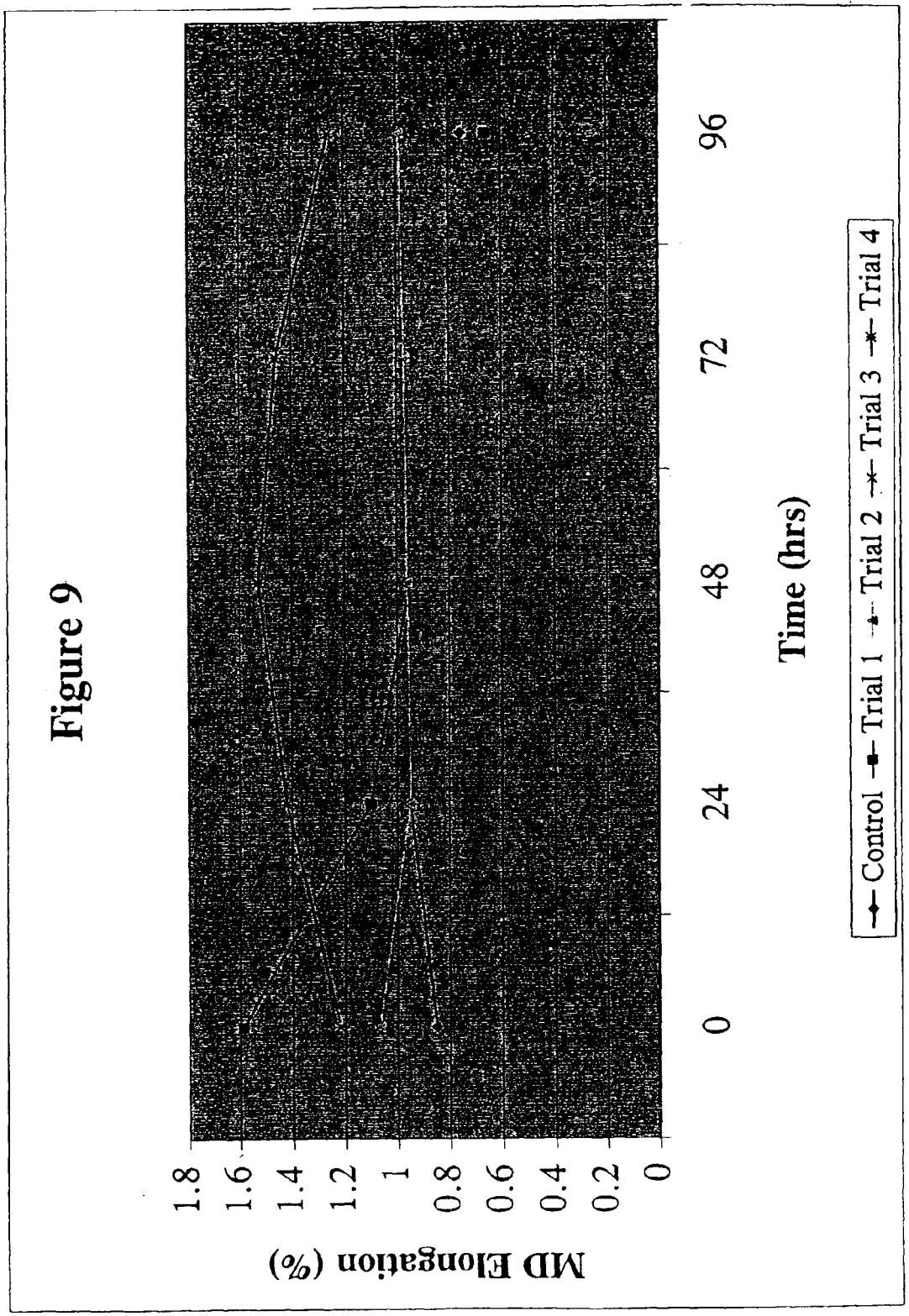
FIG. 9 is a humid aging study of three low boron containing glass wool/chopped glass fiber composites trial samples which incorporates different binders than in FIG. 8 demonstrating percent elongation in comparison to a control sample of traditional HEPA media with borosilicate glass wool and E-glass with 4–7% boron content as reinforcing material.

FIGS. 8 and 9 show MD elongation strengths for Examples 1 and 2. These results also indicate that the low boron containing composites retain elongation parameters and, in general, showed improved elongation properties over the high boron containing control sample after humid aging (described above, zero point at zero hours in the dried state).

Example 3

A sample composite was prepared following Example 1 with the addition of 0 to 2.0% polyvinyl alcohol fiber added as a reinforcement fiber. The binder, water repellent and surfactant composition was like that of Example 1 such that the total organic content of the composite was between 4.0 and 10%.

FIG. 1 demonstrates that the control sample, described above, retains superior creased tensile strength in comparison to trials 1 and 2 of Example 3 which have incorporated into the borosilicate glass wool a chopped fiber, Chem glass, having high sodium content and a fairly low calcium content 67% $SiO_2$, 7.0% $Al_2O_3$, 12% NaO, 9.5% CaO, and 4.2%

Figure 4:
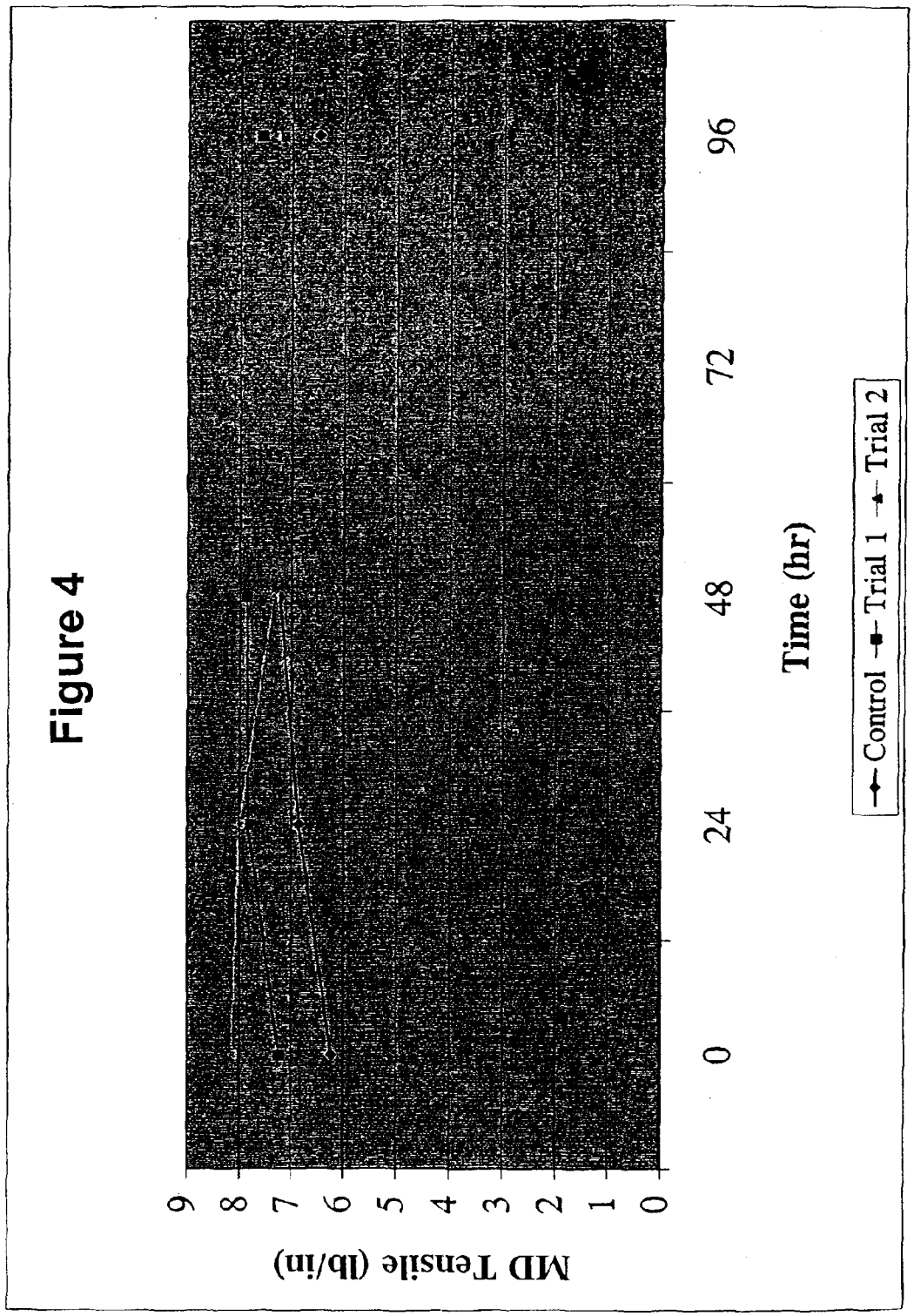
FIG. 4 is a humid aging study which depicts the tensile strength in low boron containing glass wool composites with chopped fibers having high amounts of sodium oxide and low amounts of calcium oxide in comparison to a control sample of traditional HEPA media with borosilicate glass wool and E-glass with 4–7% boron content as reinforcing material.
Figure 7:
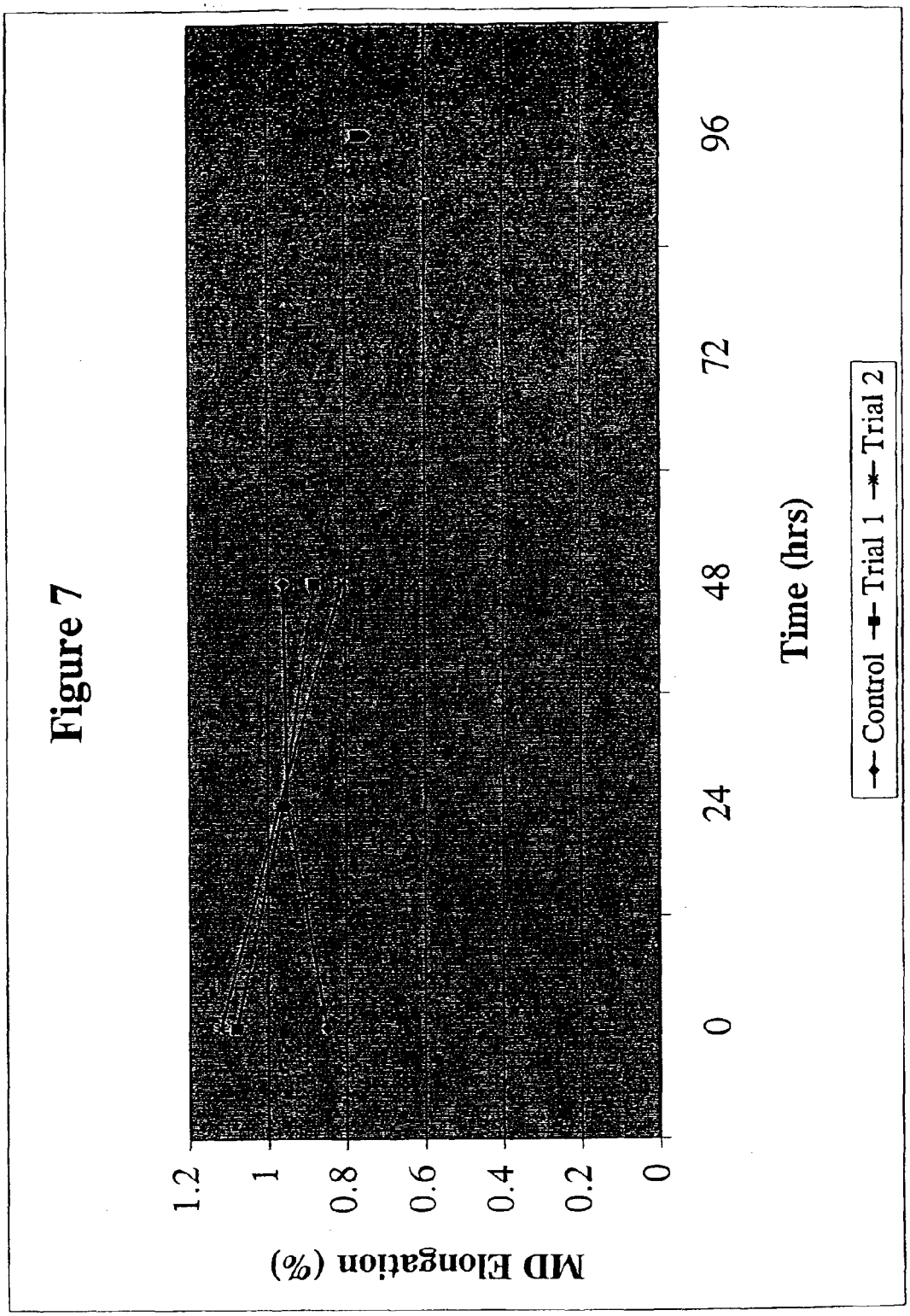
FIG. 7 is a humid aging study which depicts the % MD elongation in low boron containing glass wool composites with chopped fibers having high amounts of sodium oxide and low amounts of calcium oxide in comparison to a control sample of traditional HEPA media with borosilicate glass wool and E-glass with 4–7% boron content as reinforcing material.

MgO. These values suggest that low boron media having sodium oxide concentrations of greater than 5.0% and calcium oxide levels below 20% do not retain adequate crease tensile strength. FIGS. 4 and 7 show the MD tensile strength and percent elongation, respectively, of the control and trials 1 and 2 of Example 3.

Those skilled in the art will know, or be able to ascertain, using no more than routine experimentation, many equivalents to the specific embodiments of the invention described herein. These and all other equivalents are intended to be encompassed by the following claims. All publications and references cited herein including those in the background section are expressly incorporated herein by reference in their entirety.

What is claimed is:

1. A nonwoven filter media composite, comprising:
   glass wool fibers essentially free of boron; and
   chopped glass fibers essentially free of boron and having an average fib diameter in the range of about 5.0 microns to 9.0 microns, the chopped glass fibers having more than about 10% by weight of aluminum oxide and more than about 20% by weight of calcium oxide, wherein said chopped glass fibers are interspersed throughout said glass wool fibers.

2. The filter media composite of claim 1, wherein said glass wool fibers contain less than about 0.2% by weight boron oxide.

3. The filter media composite of claim 1, wherein said chopped glass fibers contain less than 1.0% by weight boron oxide.

4. The filter media composite of claim 1, wherein said glass wool fibers have an average diameter between about 0.1 microns and about 5.0 microns.

5. The filter media composite of claim 4, wherein said glass wool fibers have an average diameter of between about 0.4 microns and about 1.0 microns.

6. The filter media composite of claim 1, wherein the length to diameter (l/d) of said glass wool fibers is between about 100 to about 10,000.

7. The filter media composite of claim 6, wherein the length to diameter (l/d) of said glass wool fibers is about 300.

8. The filter media composite of claim 1, wherein the chopped glass fibers have an average diameter of about 6.5 microns.

9. The filter media composite of claim 1, wherein the chopped glass fibers have an average length of between about a quarter of an inch to a half an inch.

10. The filter media composite of claim 1, wherein said composite further includes a binder.

11. The filter media composite of claim 10, wherein said binder is between about 2 and 10% by weight of said composite.

12. The filter media composite of claim 11, wherein said binder is between about 3 and 9% by weight of said composite.

13. The filter media composite of claim 10, wherein said binder is an styrene-acrylic binder.

14. The filter media composite of claim 1, wherein said composite further includes a water repellent.

15. The filter media composite of claim 14, wherein said water repellent is between about 0.01% and 5.0% by weight of said composite.

16. The filter media composite of claim 15, wherein said water repellent is between about 0.05% and about 3.0% by weight of said composite.

17. The filter media composite of claim 14, wherein said water repellent is a fluoroacrylate.

18. The filter media composite of claim 1, wherein said composite further includes a surfactant.

19. The filter media composite of claim 18, wherein said surfactant is between about $1.5 \times 10^{-5}$% and about 1.0% by weight of said composite.

20. The filter media composite of claim 18, wherein said surfactant is between about $5 \times 10^{-5}$ and about 0.1% by weight of said composite.

21. The filter media composite of claim 1, wherein said chopped glass fibers have between about 55% and about 65% $SiO_2$ by weight.

22. The filter media composite of claim 21, wherein said chopped glass fibers have between about 59% and about 60% $SiO_2$ by weight.

23. The filter media composite of claim 1, wherein said chopped glass fibers have between about 10% and 15% $Al_2O_3$ by weight.

24. The filter media composite of claim 23, wherein said chopped glass fibers have about 13% $Al_2O_3$ by weight.

25. The filter media composite of claim 1, wherein said chopped glass fibers have less than about 0.6% boron by weight.

26. The filter media composite of claim 1, wherein said chopped glass fibers have less than about 1% iron oxides by weight.

27. The filter media composite of claim 26, wherein said chopped glass fibers have less than about 0.5% iron oxides by weight.

28. The filter media composite of claim 1, wherein said chopped glass fibers have less than about 2% sodium oxide by weight.

29. The filter media composite of claim 28, wherein said chopped glass fibers have less than about 1.0% sodium oxide by weight.

30. The filter media composite of claim 1, wherein said chopped glass fibers have less than about 3.0% potassium oxide by weight.

31. The filter media composite of claim 30, wherein said chopped glass fibers have less than about 0.5% potassium oxide by weight.

32. The filter media composite of claim 1, wherein said chopped glass fibers have between about 20% and about 25% calcium oxide by weight.

33. The filter media composite of claim 32, wherein said chopped glass fibers have between about 21% and about 23% sodium oxide by weight.

34. The filter media composite of claim 1, wherein said chopped glass fibers have less than about 5% magnesium oxide by weight.

35. The filter media composite of claim 34, wherein said chopped glass fibers have less than about 4.0% magnesium oxide by weight.

36. The filter media composite of claim 1, wherein said glass wool fibers have less than about 70% $SiO_2$ by weight.

37. The filter media composite of claim 36, wherein said glass wool fibers have between about 62% and about 69% $SiO_2$ by weight.

38. The filter media composite of claim 1, wherein said glass wool fibers have less than about 7% $Al_2O_3$ by weight.

39. The filter media composite of claim 38, wherein said glass wool fibers have between about 2.5% and about 6.5% $Al_2O_3$ by weight.

40. The filter media composite of claim 1, wherein said glass wool fibers have less than about 0.5% iron oxides by weight.

41. The filter media composite of claim 40, wherein said glass wool fibers have less than about 0.02% iron oxides by weight.

42. The filter media composite of claim 1, wherein said glass wool fibers have less than about 0.2% boron by weight.

43. The filter media composite of claim 42, wherein said glass wool fibers have less than about 0.08% boron by weight.

44. The filter media composite of claim 1, wherein said glass wool fibers have less than about 15% sodium oxide by weight.

45. The filter media composite of claim 44, wherein said glass wool fibers have between about 8.5% and about 12.5% sodium oxide by weight.

46. The filter media composite of claim 1, wherein said glass wool fibers have less than about 7% potassium oxide by weight.

47. The filter media composite of claim 46, wherein said glass wool fibers have between about 2.5% and about 7.0% potassium oxide by weight.

48. The filter media composite of claim 1, wherein said glass wool fibers have less than about 10.0% calcium oxide by weight.

49. The filter media composite of claim 48, wherein said glass wool fibers have between about 4.0% and about 6.0% calcium oxide by weight.

50. The filter media composite of claim 1, wherein said glass wool fibers have less than about 5% magnesium oxide by weight.

51. The filter media composite of claim 50, wherein said glass wool fibers have between about 2.5% and about 5.0% magnesium oxide by weight.

52. The filter media composite of claim 1, wherein said glass wool fibers have less than about 10% barium oxide by weight.

53. The filter media composite of claim 52, wherein said glass wool fibers have between about 0% and about 9.5% barium oxide by weight.

54. The filter media composite of claim 1, wherein said glass wool fibers have less than about 5% zinc oxide by weight.

55. The filter media composite of claim 54, wherein said glass wool fibers have between about 0.5 and about 3.0% zinc oxide by weight.

56. The filter media composite of claim 1, wherein said chopped glass fibers have between about 55% and about 65% $SiO_2$, between about 10% and 15% $Al_2O_3$, between about 0% and less than about 1% boron, less than about 1% iron oxides, less than about 2.0% sodium oxide, less than about 3.0% potassium oxide, between about 20% and 25% calcium oxide and less than about 5% magnesium oxide by weight, and wherein said glass wool fibers have less than about 70% $SiO_2$ by weight, less than about 7% $Al_2O_3$, less than about 0.5% iron oxides, less than about 0.2% boron, less than about 15% sodium oxide, less than about 7% potassium oxide, less than about 10.0% calcium oxide, less than about 5% magnesium oxide, less than about 10% barium oxide, and less than about 5% zinc oxide by weight.

57. The filter media composite of claim 56, wherein said chopped glass fibers make up between about 5% and about 40% of the total weight of said filter media composite.

58. The filter media composite of claim 1, wherein hopped glass fibers have between about 59% and about 60% $SiO_2$, about 13% $Al_2O_3$, less than about 0.6% boron, less than about 0.5% iron oxides, less than about 1.0% sodium oxide, less than about 0.5% potassium oxide, between about 21% and about 23% calcium oxide, 4.0% magnesium oxide by weight, and said glass wool fibers have between about 6% and about 69% $SiO_2$, between about 2.5% and about 6.5% $Al_2O_3$, less than about 0.2% iron o ides, less than about 0.08% boron, between about 8.5% and about 12.5% sodium oxide, between about 2.5% and about 7.0% potassium oxide, between about 4.0% and about 6.0% calcium oxide, between about 2.5% and about 5.0% magnesium oxide, between about 0% and about 9.5 barium oxide, and between about 0.5 and about 3.0% zinc oxide by weight.

59. The filter media composite of claim 58, wherein said chopped glass fibers make up between about 5% and about 40% of the total weight of said filter media composite.

60. The filter media composite of claim 1, wherein said chopped glass fibers make up between about 5% and about 40% of the total weight of said filter media composite.

61. The filter media composite of claim 1, wherein said chopped glass fibers make up between about 20% and about 25% of the total weight of said filter media composite.

62. A nonwoven filter media composite, comprising:
  glass wool fibers essentially free of boron; and
  chopped glass fibers essentially free of boron and having an average fiber diameter in the range of about 5.0 microns to 9.0 microns, the chopped glass fibers being interspersed throughout the wool fibers;
  wherein the filter media has a crease tensile strength value of at least a out 2.5 lb/inch.

63. The nonwoven filter media of claim 62, wherein crease tensile strength diminishes less than about 50% over a period of 48 hours.

* * * * *